United States Patent
Haupt et al.

[11] Patent Number: 5,161,636
[45] Date of Patent: Nov. 10, 1992

[54] ALL-WHEEL DRIVE TRACTOR

[75] Inventors: Josef Haupt, Tettnang; Thomas Niezurawski; Ünal Gazyakan, both of Friedrichshafen, all of Fed. Rep. of Germany

[73] Assignee: Zahnradfabrik Friedrichshafen AG, Fed. Rep. of Germany

[21] Appl. No.: 613,480

[22] PCT Filed: Apr. 25, 1989

[86] PCT No.: PCT/EP89/00448
§ 371 Date: Oct. 25, 1990
§ 102(e) Date: Oct. 25, 1990

[87] PCT Pub. No.: WO89/10279
PCT Pub. Date: Nov. 2, 1989

[30] Foreign Application Priority Data
Apr. 30, 1988 [DE] Fed. Rep. of Germany ....... 3814689

[51] Int. Cl.$^5$ .............................................. B60K 17/35
[52] U.S. Cl. ..................................... 180/248; 74/650; 180/249; 475/84; 475/86; 475/230
[58] Field of Search ............... 180/248, 249, 233, 247; 74/66 ST, 650; 475/221, 230, 84, 86

[56] References Cited
U.S. PATENT DOCUMENTS
4,741,407  5/1988  Torii et al. ..................... 180/248
4,829,849  5/1989  Masuda et al. ................. 180/247
4,895,217  11/1990  Hueckler et al. ............. 180/248

FOREIGN PATENT DOCUMENTS
2933267  3/1981  Fed. Rep. of Germany .
3434395  5/1985  Fed. Rep. of Germany .
3427725  8/1985  Fed. Rep. of Germany .
3708063  9/1987  Fed. Rep. of Germany .
2434969  3/1980  France .
192948  8/1986  Japan ................... 475/230

Primary Examiner—Mitchell J. Hill
Attorney, Agent, or Firm—Davis, Bujold & Streck

[57] ABSTRACT

In an all-wheel driven field tractor whose front-axle differential (6) and rear-axle differential (15) are permanently driven in arable land by output shafts (2 and 3) of a gear change (1) so that a rigid connection exists between front and rear axles, the higher speeds of the front axle (7) appearing when cornering must be compensated. Besides, a mechanism for compensating the axle speeds must be adapted to be integrated in the field tractor without substantial constructional changes. For this purpose there is situated between the crown gear (12) and the differential cage (14) of the rear-axle differential (15) a clutch (16) designed as a control slip clutch having its slip status regulated according to the parameters of the track radius to be executed and/or the traction needed.

9 Claims, 3 Drawing Sheets

ALL-WHEEL DRIVE TRACTOR

The invention concerns an all-wheel driven field tractor having a gear change that comprises a front and a rear output shaft, wherein the front output shaft is connectable to a front-axle differential and a rear-axle differential can be driven via the rear output shaft as well as a power train including a clutch, a bevel-pinion shaft and a crown gear.

BACKGROUND OF THE INVENTION

An all-wheel driven motor vehicle of the kind mentioned above has been disclosed in German Patent 29 33 267. The gear change of this field tractor has a rear-mounted range change group with an overdrive for transportation speed in which the field tractor must generally be operated with front-wheel drive. A gear of an axle reduction situated between the output shaft and the bevel-pinion shaft is connected, when working in arable land, with the bevel-pinion shaft via a positive locked clutch. Simultaneously with the actuation of the overdrive, said positive locked clutch is released via a connecting linkage. Favorable traction values can be obtained in heavy traction works of the field tractor in arable land only with permanent all-wheel drive, the rigid connection between front and rear axles having a negative effect when the field tractor corners. The problem consists in that the front wheels, as a result of the larger radius of curve needed for maintaining traction, must rotate quicker than the rear wheels. Due to the equal axle speeds, the front wheels are pushed when cornering so that, as a consequence of the increased slip, the traction of the field tractor cannot be utilized and serious warping of the soil also appears as well as an enlarged radii of turn of the field tractor.

SUMMARY OF THE INVENTION

Therefore, the problem to be solved by the invention is to avoid the above mentioned problems and consequently to provide a mechanism which, when cornering, prevents distortions between front and rear axles when the all-wheel drive of the field tractor is permanently engaged and which can be integrated in the field tractor using constructionally simple means and requiring small space.

The above problem is solved in an all-wheel driven field tractor of the kind mentioned by the fact that the clutch is situated between the crown gear and a differential cage of the rear-axle differential and is designed as a controlled slip clutch whose slip status is regulated according to the size of the track radius to be executed with the field tractor and/or the traction needed. It is possible here to feed to a central unit certain parameters, which affect the track radius, as control volumes. The slip controlled at a given time in the power train toward the rear axle allows a reduction of speed of the rear axle so that good traction remains in the front axle during cornering. Due to the fact that when working the soil, for instance, with a plough or rotary harrow, it is necessary to turn around on the narrowest space at the end of the furrow or field where the mounted implement does not engage the soil, the change of traction need can also be used as a parameter for the slip status. If according to the invention the clutch is situated between the crown wheel and differential cage, on the one hand, it is possible to transmit a great torque as a result of the radial dimension of the clutch and, on the other hand, the accommodation of the controlled slip clutch requires absolutely no structural changes in the field tractor inasmuch as sufficient space is normally available in the rear-axle housing for its accommodation. The gear change remains unchanged.

Although DE-OS 34 27 725 has disclosed placing a controlled slipping clutch in the power train of a rear axle of a motor vehicle, what is concerned there is a front-driven automobile where the slip of the additionally activatable wheels of the rear axle must remain in a controllable firm relation to the slip of the wheels of the front axle. Besides, the controlled slip clutch is situated within the drive shaft leading to the rear axle.

DE-OS 34 34 395 has also disclosed a front-driven automobile where a clutch situated in the transfer case has to be released depending on a steering angle of the steering mechanism of the vehicle while simultaneously falling below a speed limit The previously known arrangement of the clutch in the transfer case undesirably enlarges the structural dimensions of the latter Agricultural field tractors are, on the contrary, provided with no separate transfer case and both front and rear output shafts are driven by a group gear-reducer unit or a main shaft of the gear change.

The steering angle of a steering mechanism of the field tractor must serve to regulate the slip status of the clutch Here the existing steering angle is detected by means of a sensor and fed to a central unit. A rigid nominal curve of the slip status of the clutch can be regulated in accordance with the steering angle; but it is also possible to regulate several variable nominal curves of the slip status by meshing in the central unit.

The actuation pressure of a single wheel brake can serve as an input signal for regulating the slip status of the clutch. If the single wheel brake is accordingly used for traversing narrow curves, then the rigid connection between the front and rear axles must likewise be removed by the slipping clutch so that the front wheels of the field tractor can traverse the narrow radius of curvature without slipping.

It is possible, in an all-wheel driven field tractor having a hydraulic three-point lifting device with a position control, to adjust the clutch in a defined slip status based on the "lift" position of the position control, said program control is of special interest when situating in the three-point lifting device implements for cultivating the soil such as plough, rotary harrow, or seed-bed combinations with which a turn has to be made on the narrowest space at the end of a furrow or of the cultivated field. Since prior to turning around the field tractor the position control of the three-point lifting device is adjusted to its "lift" position, this signal can likewise be used for adjusting the clutch.

In all the aforementioned possibilities of controlling the slip status of the clutch, there must be situated, on the crown gear and on the differential cage actual-value sensors 60, 60' on the basis of the speed differences $\Delta n$, detect the existing slip status of the clutch.

It is proposed, in further development of the invention, to design the clutch as a hydraulically actuated wet multi-disc clutch wherein a collar axially extending from the crown gear accommodates external discs and the differential cage internal discs by means of cylindrical gearing. The adequately designed clutch is in a position of transmitting a great torque, it further being possible to integrate it without problem in the rear-axle housing of the field tractor. Since the structural dimensions of the unit comprised of the rear-axle differential and the clutch hardly increase in comparison with those of a normal rear-axle differential, field tractors of a series can optionally be or not be equipped with a slip-controlled clutch using the same rear-axle housing.

Furthermore the clutch, relative to the longitudinal central axis of the bevel-pinion shaft, can be situated opposite the crown gear while the collar is rotatably mounted on the differential cage. In this manner a very extensive support of the collar is made possible so that the radial stresses resulting from the drive of the crown gear are not transmitted to the clutch. Several low-friction or roller bearings serve to support the collar on the periphery of the differential cage.

It is proposed to provide, secured to the housing and sliding on the periphery of the differential cage, a ring through which it is possible to feed pressurized fluid to an actuation cylinder of the clutch and lubricant to the internal and external discs thereof.

Alternatively it is possible, to situate the crown gear on the periphery of an external cage that encloses the differential cage all around, the external cage being supported in the rear-axle housing on both sides via tapered roller bearings and housing external discs of the wet multi-disc clutch as well as the actuation mechanism thereof. In this manner the gearing stresses can be introduced directly via the central cage into the tapered roller bearings. Thus, clearing setting of the bevel drive comprised of bevel pinions and a crown gear can in a simple manner take place on the bearing of the external cage. The bearing of the differential cage in the external cage is theoretically stress-free and can be designed as a simple contact bearing with low-friction bearings.

Besides, the clutch must be situated in an area of the external cage which adjoins a face end of the crown wheel opposite a crown wheel gearing. In this manner the clutch can be very favorably accommodated spacewise in the rear-axle housing.

Finally, the clutch must be situated between a hub-like section of the external cage, having substantially the same radial dimensions as the crown gear, and the differential cage. Thereby, the clutch discs can be built with relatively large friction surfaces so that a great torque can be transmitted by means of the multi-disc clutch and overheating is prevented on the discs that slip when cornering.

The invention is not limited to the combination of features of the claims. Other logical possible combinations result for the expert from the claims and individual features of the claims, as the problem arises.

BRIEF DESCRIPTION OF THE DRAWINGS

For further explanation of the invention, reference is had to the drawings where two embodiments of the invention are shown in simplified manner. In the drawings.

DESCRIPTION OF THE PREFERRED EMBODIMENT

Figure 1:
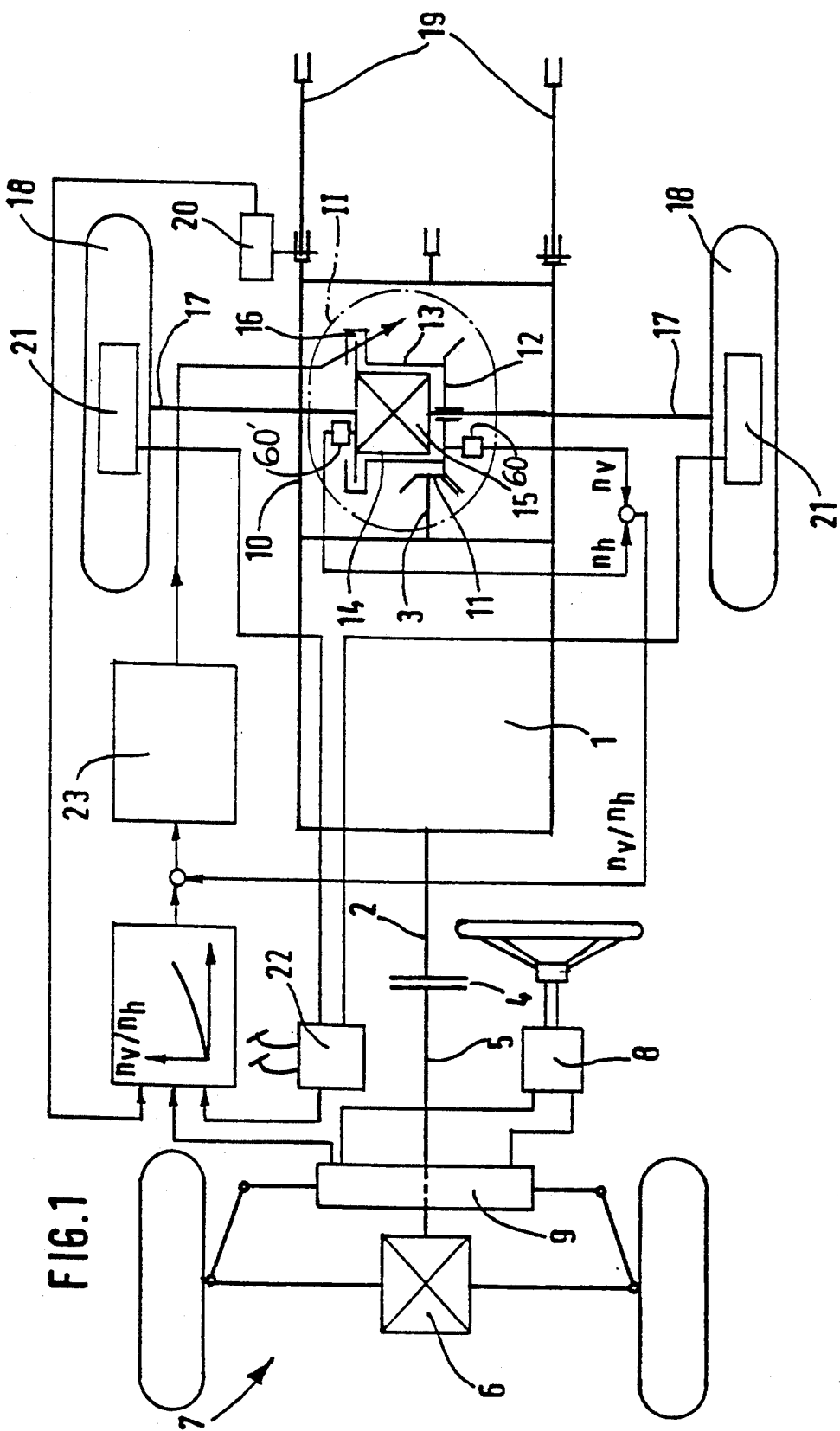
FIG. 1 diagrammatically shows in top view a drive unit of a field tractor.

In FIG. 1 a field tractor is diagrammatically shown which has a gear change i driven by an internal combustion engine, not shown in the drawing, and having a front output shaft 2 and a rear output shaft 3. A steerable front axle 7 can be driven by means of the front output shaft 2 via a change-over clutch 4 and a drive shaft 5 as well as a front-axle differential 6. The steering mechanism of the front axle 7 comprises a steering valve 8 and a setting device 9.

The rear output shaft 3 of the gear change i is designed in its extension that is passed into a rear-axle housing 10 as a bevel-pinion shaft 11 meshed with a crown gear 12. The crown gear 12 has an axially extending collar 13 and is freely rotatably supported on a differential cage 14 of a rear-axle differential 15. At the same time, the crown gear 12 can be connected with the differential cage 14 via the sleeve-like collar 13 using a clutch 16 with controlled slip. Rear wheels 18 are driven by a rear-axle differential 15 via knock-out axles 17.

A hydraulic three-point lifting device 19 for accommodating assembly implements of the field tractor, which has a position-control device 20 for control of its lifting operation, is additionally situated on the rear-axle housing 10. The rear wheels 18 of the field tractor are provided with wheel brakes 21 which can be braked separately or jointly by means of a brake-actuation mechanism 22.

A controller 23 is further provided to which can be fed a steering angle of the steering mechanism 8, 9, a brake-actuation pressure of the brake-actuation mechanism 22, in case of single-wheel braking, and a signal of the position control 20. In accordance with said input signals, the control 23 regulates the slip status of the clutch 16 $n_v/n_h$ ($n_v$=front-axle speed; $n_h$=rear-axle speed).

Figure 2:
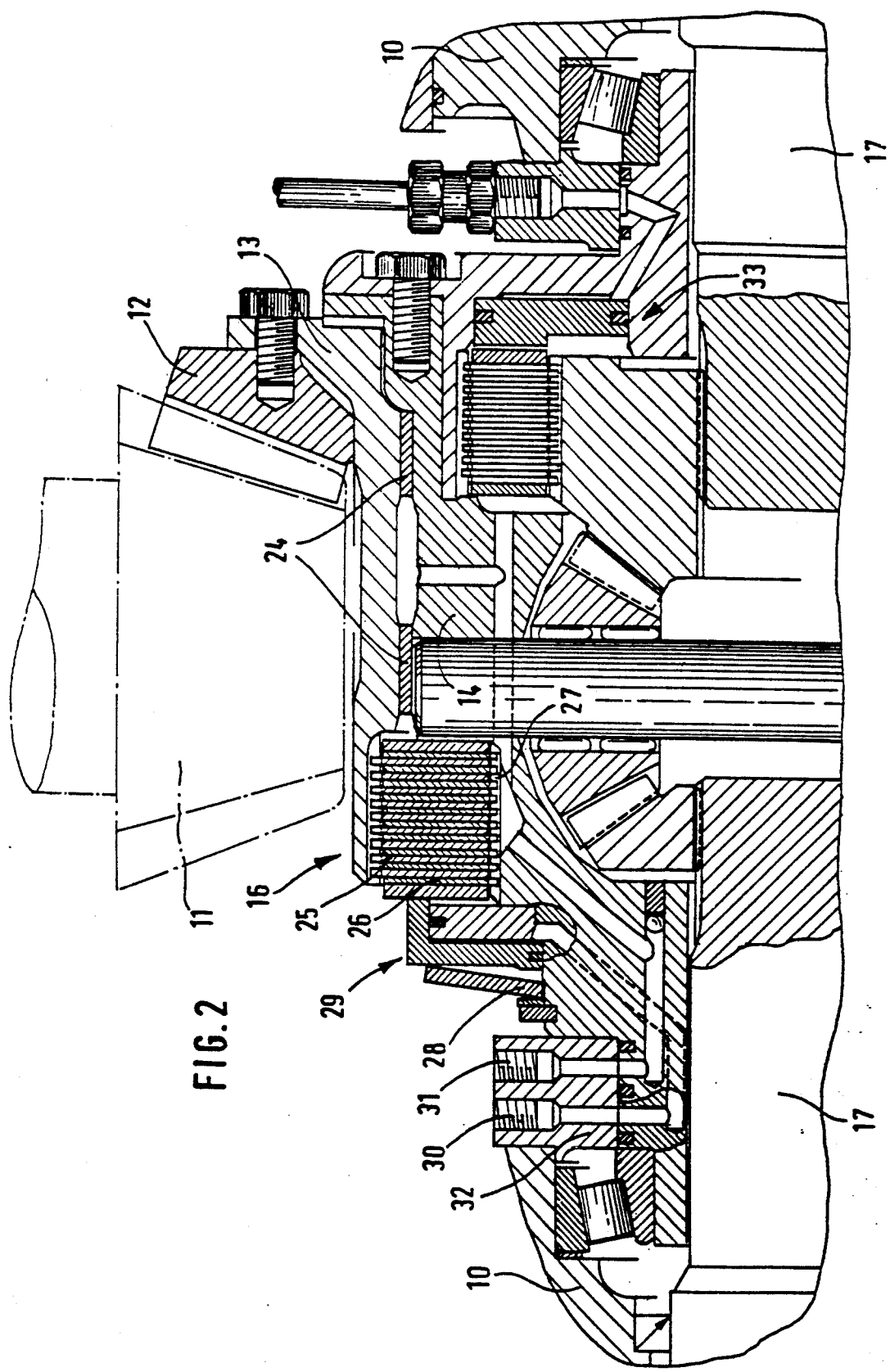
FIG. 2 is a longitudinal section of a first embodiment of a rear-axle differential provided with a slip clutch according to the invention, which corresponds to cut-out II of the diagrammatic representation of FIG. 1

From FIG. 2 the arrangement of the clutch 16 on the differential cage 14 is to be understood in detail. The bevel-pinion shaft 11 drives the crown gear 12 upon which is fastened the sleeve-like collar 13. Said collar 13 is freely rotatably supported on the periphery of the differential cage 14 by means of two low-friction bearings 24. The clutch 16 is designed as wet multi-disc clutch having its external discs 25 secured to the collar 13 and its internal discs 26 secured on a gearing 27 on the periphery of the differential cage 14. The clutch 16 is engageable via a cup spring 28 and controllable to a slip status via an actuation cylinder 29. For this purpose, the actuation cylinder 29 is supplied, via a hydraulic connection 30, with pressurized fluid having a pressure regulated by the controller 23 according to the steering angle parameters, braking pressure, in case of single-wheel braking, and lift control of the position control. A lubricant connection 31 serves to supply the internal and external discs 25, 26 as well as the low-friction bearing 24 with coolant or lubricant. Both the hydraulic connection 30 and the lubricant connection 31 are situated in a ring 32 that slides on the periphery of the differential cage 14 and is secured to the rear-axle housing 10.

A differential lock 33 is in addition situated in the area of the crown gear 12 by means of which the compensating effect obtainable over the rear-axle differential 15 can be suppressed.

The mechanism operates as follows. The cup spring 28 ensures that the axial force needed for rigid through drive between front axle 7 and rear axle (knock-out axle) 17 be transmitted via the actuation cylinder 29 in the pressureless condition of said actuation cylinder 29. In this state, the field tractor is operated when driving straight ahead and with implements lowered via the three-point lifting device 19 so that a good traction of the vehicle results. If the driver lifts the assembled implement such as a plough, rotary harrow or soil-cultivation combination by the three-point lifting device 19, or executes a steering movement via the steering mechanism 8, 9 or by means of single-wheel braking via the brake-actuation mechanism 22, then these signals are fed to the controller 23 where upon the latter raises the pressure in the actuation cylinder in a manner such that a defined slip results between the external discs 25 and the internal discs 26, and consequently a speed difference between the crown gear 12 and the differential cage 14. This slip, at the same time, compensates the speed increase occurring on the front axle 7 as a consequence of the steering operation while the speed difference between front and rear axles is compensated by the slip of the clutch 16.

Figure 3:
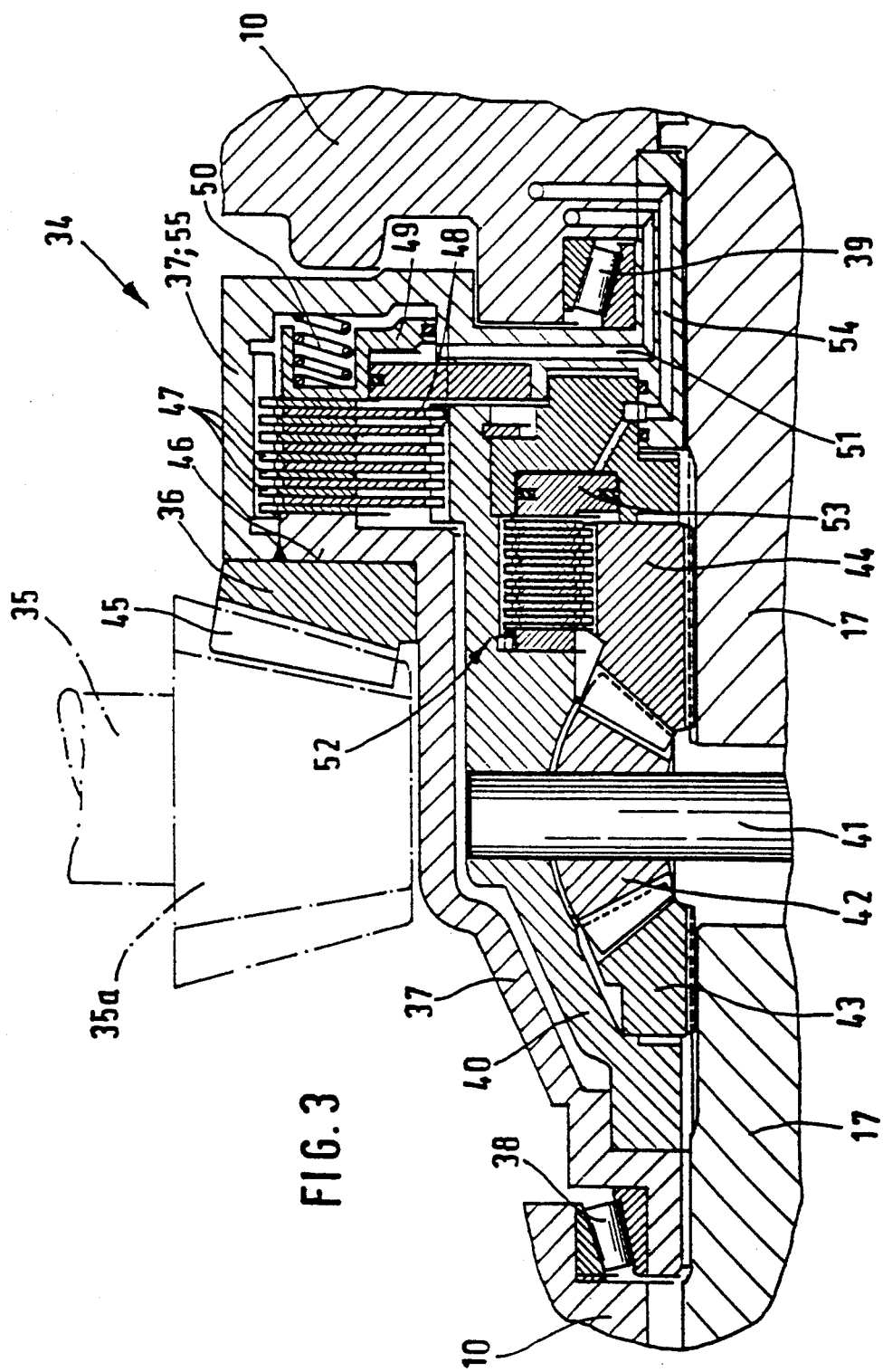
FIG. 3 is a second embodiment, as longitudinal section, of a rear-axle differential with slip clutch wherein a differential cage is surrounded by an external cage.

From FIG. 3, the structural elements explained in detail herebelow which must appear in the place of the elements shown in FIG. 1, cutout II, and FIG. 2 are to be understood. For the rest, the functions described with reference to FIG. 1 apply to the embodiment of FIG. 3. Accordingly, a clutch 34 is situated within the rear-axle housing 10. A bevel-pinion shaft 35 upon which a bevel pinion 35a is situated drives a crown gear 36 A fixed connection exists between said crown gear 36 and an external cage 37 and the external cage 37 is supported over two tapered roller bearings 38 and 39 in the rear-axle housing 10 A differential cage 40 accommodates, via bearing bolts 41, differential bevel gears 42 which are 10 meshed with a left axle bevel gear 43 and a right axle bevel gear 44. Both the left and right axle bevel gears 43 and 44 are fixedly connected with the knock-out axle 17 leading to the rear wheels 18.

The crown gear 36 is connected by its end face 46 opposite a gear 45 and on its internal periphery with the external cage 37. The clutch 34 has external discs 47 fixedly passed on the external cage while internal discs 48 of the clutch 34 are fastened on the differential cage 40. An actuation piston 49, loadable via a compression spring 50 in switch-in direction of the clutch 34, is actuated with pressurized fluid via a pressurized-fluid bore 51 in a manner such that its axial pressure on the external and internal discs 47, 48 becomes reduced and a control of the clutch 34 into its slip status consequently results Between the right axle bevel gear 44 and the differential cage 40 is situated a differential lock 52 likewise designed as a multi-disc clutch and whose actuation piston 53 can be actuated with pressure via a pressurized-fluid bore 54 The clutch 34 is in a hub-like section 55 of the external cage 37 whose radial dimension substantially corresponds to that of the crown gear 36.

We claim:

1. An all-wheel field tractor having a gear change transmission (1) which has a front output shaft (2) and a rear output shaft (3) connected therewith, said front output shaft (2) being connectable with a front-axle differential (6) and said rear output shaft (3) being drivably connected to a rear-axle differential (15) via a power train comprising a clutch (16, 34), a bevel-pinion shaft (11) and a crown gear (12, 13), wherein said clutch (16, 34) is located in a drive path of the field tractor between said crown gear (12, 36) and a differential cage (14, 40) of said rear-axle differential (15), said clutch (16, 34) is a slip controlled clutch with a clutch slip regulated according to an input signal responding to at least one of a traction, required of the field tractor, and a turning radius to be executed by the field tractor, and a steering angle of a steering mechanism (8, 9) serves as an input signal for controlling of the clutch slip.

2. An all-wheel driven field tractor according to claim 1, wherein a brake-actuation pressure of a single-wheel brake (21, 27) serves additionally as an input signal for controlling of the clutch slip.

3. An all-wheel driven field tractor according to claim 1, wherein said clutch (16) is a hydraulically actuated wet multi-disc clutch having internal (26) and external discs (256), and a collar (13), which axially extends from said crown gear (12), supports said external discs (25) and said differential cage (14) supports, vis a circumferential gearing (27), said internal discs (26).

4. An all-wheel driven field tractor according to claim 3, wherein said clutch (16), relative to a longitudinal central axis of said bevel-pinion shaft (11), is situated opposite said crown gear (12) and said collar (13) is rotatably supported by said differential cage (14).

5. An all-wheel driven field tractor according to claim 3, wherein a ring (32) is fastened to a housing of said differential cage (14) and said ring has a first clutch (16) through which pressurized fluid is fed to actuate the actuation cylinder (29) of said clutch (16), and a second passage for lubricating said internal and external discs (25, 26).

6. An all-wheel driven field tractor having a gear change transmission (1) which has a front output shaft (2) and a rear output shaft (3) connected therewith, said front output shaft (2) being connectable with a front-axle differential (6) and said rear output shaft (3) being drivably connected to a rear-axle differential (15) via a power train comprising having a clutch (16, 34), a bevel-pinion shaft (11) and a crown gear (12, 13), wherein
a) said clutch (16, 34) is located in a drive path of the field tractor between said crown gear (12, 36) and a differential cage (14, 40) of said rear-axle differential (15), said clutch (16, 34) is a slip controlled clutch with a clutch slip regulated according to at least one of a traction, required of the field tractor, and a turning radius to be executed by the field tractor, and
b) a hydraulic three-point lifting device (19) which includes a position control device (20), a raised position of said position control device (20) serving as an input signal for adjusting the clutch slip.

7. An all-wheel field tractor having a transmission (1) which has a front output shaft (2) and a rear output shaft (3) connected therewith, said front output shaft (2) being connectable with a front-axle differential (6) and said rear output shaft (3) being drivably connected to a rear-axle differential (15) via a power train comprising a clutch (34), a bevel-pinion shaft (11) and a crown gear (12, 13, 36), wherein said clutch (34) is located in a drive path of the field tractor between said crown gear (12, 36) and a differential cage (14, 40) of said rear-axle differential (15), and said clutch (34) is a slip controlled clutch with a clutch slip regulated according to at least one of a traction, required of the field tractor, and a turning radius to be executed by the field tractor;

said crown gear (36) is fixedly situated on a periphery of an external cage (37) that surrounds said differential cage (40), said external cage (37) is supported, via tapered roller bearings (38, 39), by a rear-axle housing (10), and said external cage (37) supports external discs (47) of said clutch (34); and said clutch (34) is a hydraulically actuated wet multi-disc clutch.

8. An all-wheel driven field tractor according to claim 7, wherein said clutch (34) is situated in an area of said external cage (37) adjoining an end face (46) of said crown wheel (36) opposite a crown-wheel gear (45).

9. An all-wheel field tractor according to claim 8, wherein said clutch (34) is situated between a hub-like section (55) of said external cage (37), which has a substantially similar radial dimension as said crown gear (36), and said differential cage (40).

* * * * *

UNITED STATES PATENT AND TRADEMARK OFFICE
CERTIFICATE OF CORRECTION

PATENT NO. : 5,161,636
DATED : November 10, 1992
INVENTOR(S) : Josef HAUPT, Thomas NIEZURAWSKI & Unal GAZYAKAN It is certified that error appears in the above-identified patent and that said Letters Patent is hereby corrected as shown below:

```
Column 6, line 18 replace "(256)" with --(25)--;
         line 20 replace "vis" with --via--;
         line 30 after "first" insert --passage, communicating with
                                       an actuation cylinder (29) of said--.
```

Signed and Sealed this

Thirtieth Day of November, 1993

Attest:

BRUCE LEHMAN

Attesting Officer

Commissioner of Patents and Trademarks